(12) United States Patent
Youm

(10) Patent No.: US 11,141,651 B2
(45) Date of Patent: *Oct. 12, 2021

(54) SERVER AND METHOD FOR PLAYING LOCATION-BASED GAME

(71) Applicant: XOGAMES INC., Seongnam-si (KR)

(72) Inventor: Eui Joon Youm, Seongnam-si (KR)

(73) Assignee: XOGAMES INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,192

(22) Filed: May 22, 2020

(65) Prior Publication Data

US 2020/0282306 A1 Sep. 10, 2020

Related U.S. Application Data

(63) Continuation of application No. 16/177,636, filed on Nov. 1, 2018, now Pat. No. 10,695,662.

(30) Foreign Application Priority Data

Nov. 1, 2017 (KR) .......................... 10-2017-0144909

(51) Int. Cl.
| | | |
|---|---|---|
| *A63F 13/216* | (2014.01) | |
| *A63F 13/31* | (2014.01) | |
| *A63F 13/327* | (2014.01) | |
| *A63F 13/34* | (2014.01) | |
| *A63F 13/71* | (2014.01) | |

(Continued)

(52) U.S. Cl.
CPC ............ *A63F 13/216* (2014.09); *A63F 13/31* (2014.09); *A63F 13/327* (2014.09); *A63F 13/335* (2014.09); *A63F 13/34* (2014.09); *A63F 13/65* (2014.09); *A63F 13/71* (2014.09);

(Continued)

(58) Field of Classification Search
None
See application file for complete search history.

(56) References Cited

U.S. PATENT DOCUMENTS

| 9,226,106 B1 | 12/2015 | Kornmann et al. |
| 9,604,131 B1 | 3/2017 | Kiyohara et al. |

(Continued)

FOREIGN PATENT DOCUMENTS

KR 20090030636 3/2009

*Primary Examiner* — Ronald Laneau
(74) *Attorney, Agent, or Firm* — Cantor Colburn LLP

(57) ABSTRACT

Provided is a game server for providing a location-based game, including: a location information receiving unit configured to receive location information of a first device from the first device; a game providing unit configured to provide a game based on the location information of the first device to the first device; and an identification information receiving unit configured to receive identification information of the first device from the first device. The location information of the first device is set based on location information of the connected second device, the first device is a device without a GPS (Global Positioning System) function and the second device is a device with the GPS function, the game providing unit allocates a first game environment to the identification information of the first device, and the identification information of the first device includes at least one of a UUID (Universal Unique Identifier), a GUID (Global Unique Identifier), and a Mac Address.

12 Claims, 13 Drawing Sheets

(51) Int. Cl.
*A63F 13/65* (2014.01)
*A63F 13/335* (2014.01)
(52) U.S. Cl.
CPC ..... *A63F 2300/40* (2013.01); *A63F 2300/401* (2013.01); *A63F 2300/5573* (2013.01)

(56) References Cited

U.S. PATENT DOCUMENTS

| | | |
|---|---|---|
| 9,782,668 B1 | 10/2017 | Golden et al. |
| 10,217,326 B2 * | 2/2019 | Cage .................. G06Q 30/0209 |
| 10,943,438 B2 * | 3/2021 | Cage .................. G06Q 30/0209 |
| 2008/0037442 A1 | 2/2008 | Bill |
| 2012/0242486 A1 | 9/2012 | Witkemper |
| 2018/0176748 A1 | 6/2018 | Kim et al. |
| 2019/0213831 A1 * | 7/2019 | Cage .................. G07F 17/3241 |

* cited by examiner

SERVER AND METHOD FOR PLAYING LOCATION-BASED GAME

TECHNICAL FIELD

The present disclosure relates to a method, a server and a device for playing a location-based game.

BACKGROUND

Most of conventional games have been developed and distributed based on PC-based OS such as Windows, and users have played the games on a desktop PC with Windows OS. Recently, with the rapid development of the mobile device market, the mobile game market has also rapidly grown. In the early 2000s, the development of mobile games was limited due to the overall poor performance of mobile devices and high communication costs. However, with the spread of mobile devices, the number of mobile game users has been greatly increased, and with the improvement in performance of mobile devices, a lot of excellent games have been developed.

In recent years, various location-based game services using GPS have been released. However, in the existing game environment, for example, PCs or notebook computers are not equipped with a GPS module. Thus, it has been difficult to use the location-based game services.

SUMMARY

In view of the foregoing, the present disclosure provides a method for providing a first device with a game based on location information of the first device by performing authentication between the first device and a second device to connect each other and setting the location information of the first device as location information of the second device.

According to an aspect of the present disclosure, a method for playing a location-based game performed by a first device includes: performing authentication for a second device; connecting the first device with the second device; receiving location information of the second device from the connected second device; setting the received location information of the second device as location information of the first device; transmitting the set location information of the first device to a game server; and receiving game data based on the location information of the first device from the game server, and the first device may be a device without a GPS (Global Positioning System) function and the second device may be a device with the GPS function.

According to another aspect of the present disclosure, a game server for providing a location-based game includes: a location information receiving unit configured to receive location information of a first device from the first device; and a game providing unit configured to provide a game based on the location information of the first device to the first device, and the first device is connected with a second device. Further, the location information of the first device is set based on location information of the connected second device, and the first device may be a device without a GPS (Global Positioning System) function and the second device may be a device with the GPS function.

According to yet another aspect of the present disclosure, a device for playing a location-based game includes: a connection unit configured to connect the device with another device; a location information receiving unit configured to receive location information of the connected other device from the other device; a location information linking unit configured to set the received location information of the other device as location information of the device; a location information transmission unit configured to transmit the set location information to a game server; and a game running unit configured to receive game data based on the location information of the device from the game server and runs the game, and the first device may be a device without a GPS (Global Positioning System) function and the second device may be a device with the GPS function.

According to the present disclosure, it is possible to provide a first device with game data based on location information of the first device by setting the location of the first device connected with a second device as location information of the second device. Further, different game environments are provided to first devices or locations of the first devices, respectively, and, thus, users playing a game with the first devices installed at multiple different areas, respectively, can be provided with various user experiences according to the different game environments. Furthermore, a game community can be activated by linking first devices installed at respective zones. Moreover, users who want to play a guild or team game can be provided temporarily with a game by first devices using location information of second devices even without joining in the game and going through an authentication process.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
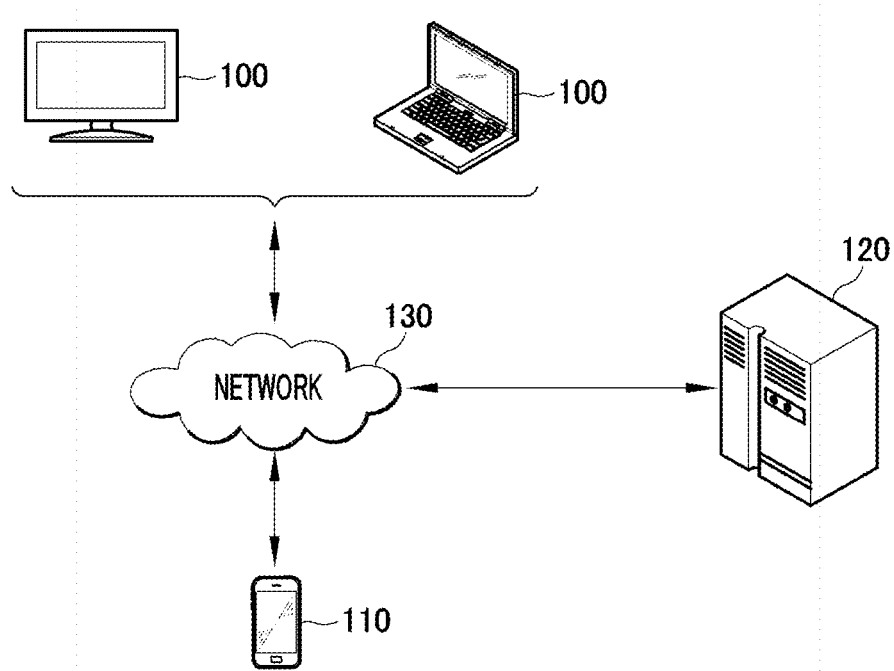
FIG. 1 is a configuration view illustrating a location-based game providing system in accordance with various embodiments described herein.

Hereinafter, embodiments of the present disclosure will be described in detail with reference to the accompanying drawings so that the present disclosure may be readily implemented by a person with ordinary skill in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Through the whole document, the term "unit" includes a unit implemented by hardware, a unit implemented by software, and a unit implemented by both of them. One unit may be implemented by two or more pieces of hardware, and two or more units may be implemented by one piece of hardware. However, the "unit" is not limited to the software or the hardware and may be stored in an addressable storage medium or may be configured to implement one or more processors. Accordingly, the "unit" may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and functions provided in the "units" can be combined with each other or can be divided up into additional components or "units". Further, the components and the "units" may be configured to implement one or more CPUs in a device or a secure multimedia card.

The terms "first device" and "second device" used herein can be implemented with computers or portable devices which can access a server or another device through a network. Herein, the computers may include, for example, a notebook, a desktop, and a laptop equipped with a WEB browser. The portable devices are, for example, wireless communication devices that ensure portability and mobility and may include a smart phone, a tablet PC, a wearable device and various kinds of devices equipped with a communication module such as Bluetooth (BLE, Bluetooth Low Energy), NFC, RFID, ultrasonic waves, infrared rays, WiFi, LiFi, and the like. Further, the term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

FIG. 1 is a configuration view illustrating a location-based game providing system in accordance with an embodiment of the present disclosure.

Referring to FIG. 1, a location-based game providing system may include a first device 100, a second device 110, and a game server 120.

The components of the location-based game providing system illustrated in FIG. 1 are typically connected to each other via a network 130. The network 130 refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WI MAX (World Interoperability for Microwave Access), Wi-Fi, Bluetooth communication, infrared communication, ultrasonic communication, VLC (Visible Light Communication), LiFi, and the like, but may not be limited thereto.

The first device 100 is configured to provide a location-based game (hereinafter, simply referred to as "game" as the case may be) based on a location of the second device 110. The first device 100 may be a device, such as an IPTV (Internet Protocol Television), a desktop PC, a display device, etc., which is not frequently changed in location, or a device, such as a notebook computer, which is frequently changed in location and not equipped with a GPS (Global Positioning System) function.

The second device 110 may include, for example, a mobile device equipped with the GPS (Global Positioning System) function. The second device 110 is a wireless communication device that ensures portability and mobility and may include a smart phone, a tablet PC, a wearable device and various kinds of devices equipped with a communication module such as Bluetooth (BLE, Bluetooth Low Energy), NFC, RFID, ultrasonic waves, infrared rays, WiFi, LiFi, and the like.

If a user of the second device 110 wants to play a game through the first device 100, processes to be performed in the second device 110 and the first device 100 are as follows.

The first device 100 performs authentication for the second device 110 and then is connected with the second device 110. Then, the first device 100 may receive location information of the second device 110 from the second device 110.

For example, if the first device 100 and the second device 110 are within a predetermined distance and each of the first device 100 and the second device 110 drives a game application, the first device 100 and the second device 110 can be automatically connected with each other.

In an authentication process between the first device 100 and the second device 110, authentication information including one of a QR code, an authentication number, and a URL link output on the first device 100 may be transmitted by the second device 110 to the game server 120 or the first device 100, and then, the game server 120 or the first device 100 may determine whether or not to authenticate connection between the first device 100 and the second device 110 based on the authentication information.

The first device 100 may set the location information of the second device 110 received from the second device 110 as location information of the first device 100. Then, the first device 100 may be provided with the location-based game based on the set location information.

In the following description, it will be assumed that the first device 100 is a device without the GPS function and the second device 110 is a device with the GPS function.

Figure 2:
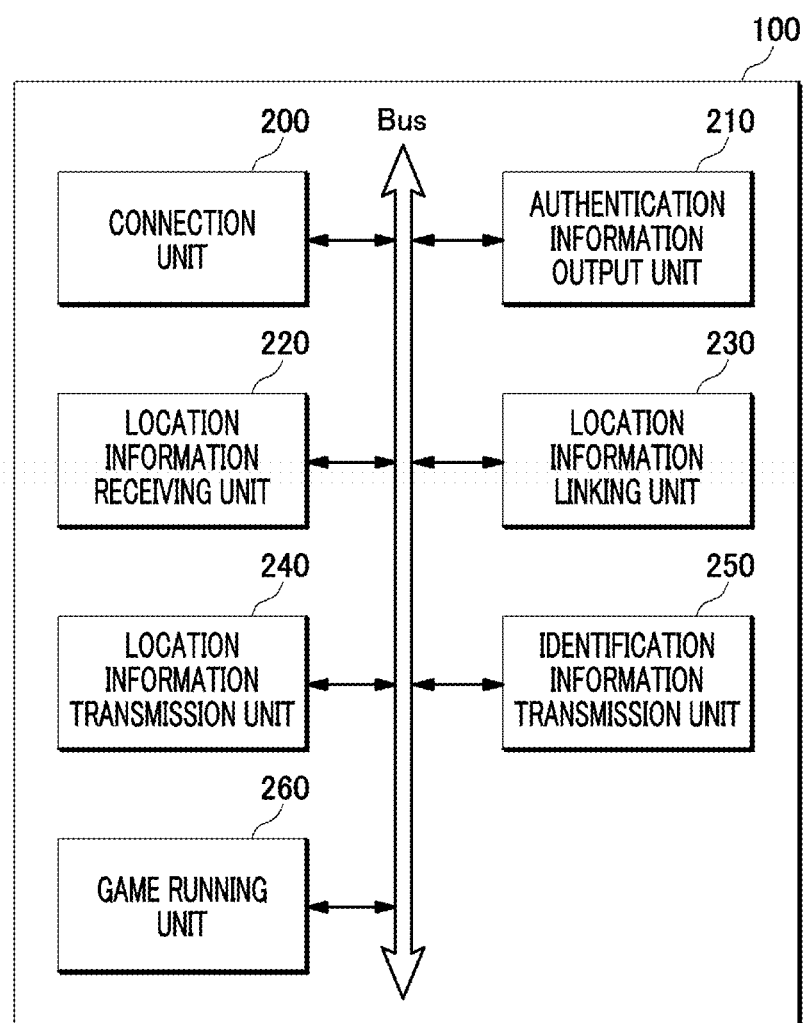
FIG. 2 is a block diagram of a first device illustrated in FIG. 1 in accordance with various embodiments described herein.

FIG. 2 is a block diagram of the first device 100 illustrated in FIG. 1 in accordance with an embodiment of the present disclosure. Referring to FIG. 2, the first device 100 may include a connection unit 200, an authentication information output unit 210, a location information receiving unit 220, a location information linking unit 230, a location information transmission unit 240, an identification information transmission unit 250, and a game running unit 260. However, the first device 100 illustrated in FIG. 2 is just an embodiment of the present disclosure and can be modified in various ways based on its components illustrated in FIG. 2.

The connection unit 200 may perform connection with the second device 110 using one of Bluetooth, WiFi Direct, and Internet network subnet information. For example, the connection unit 200 may perform connection with the second device 110 using Internet network band information (e.g., subnet address information (203.302.22.xxx)) for the second device 110.

The authentication information output unit 210 may output one of a QR code, an authentication number, and a URL link as authentication information on the screen of the first device 100 in order for the second device 110 which wants to communicate with the first device 100 to perform authentication for location information sharing with the first device 100. Herein, the QR code, the authentication number, and the URL link output on the first device 100 may include, for example, identification information of the first device 100, an authentication ID of the first device 100, and the like. The identification information of the first device 100 may include at least one of a model unique value (e.g., UUID (Universal Unique Identifier), GU ID (Global Unique Identifier)) for the first device 100 and a network address (Mac Address) for the first device 100.

Herein, the authentication information (one of the QR code, the authentication number, and the URL link) output on the first device 100 may be transmitted to the game server 120 through the second device 110, and the game server 120 may perform authentication of the second device 110 for location sharing with the first device 100 based on the authentication information received from the second device 110. Then, when the game server 120 completes the authentication of the second device 110, the first device 100 and the second device 110 may be connected with each other.

In another embodiment, the connection unit 200 may perform connection with the second device 110 using at least one of communication means such as Bluetooth, WiFi Direct, infrared communication, and cellular communication. For example, the connection unit 200 may receive a QR code (or a number code, URL link information, etc.) as authentication information for sharing of the location information of the second device 110 output on the screen of the first device 100 directly from the second device 110 using at least one of communication means such as Bluetooth, WiFi Direct, infrared communication, and cellular communication and then, the first device 100 may perform its own authentication process to perform connection with the second device 110. Otherwise, if the second device 110 inputs URL link information containing a predetermined connection set value (i.e., information for connection setup with the first device 100) into a web browser, the connection unit 200 may perform connection with the second device 110.

If the connection with the second device 110 is performed, the connection unit 200 may maintain a session between the first device 100 and the second device 110.

The location information receiving unit 220 may receive location information of the second device 110 from the second device 110 connected with the first device 100. Herein, the location information of the second device 110 may include, for example, GPS coordinate values corresponding to a location of the second device 110.

The location information linking unit 230 may set the received location information of the second device 110 as location information of the first device 100.

Hereinafter, a method for setting location information of the first device 100 will be described briefly with reference to FIG. 4A and FIG. 4B.

Figure 4A:
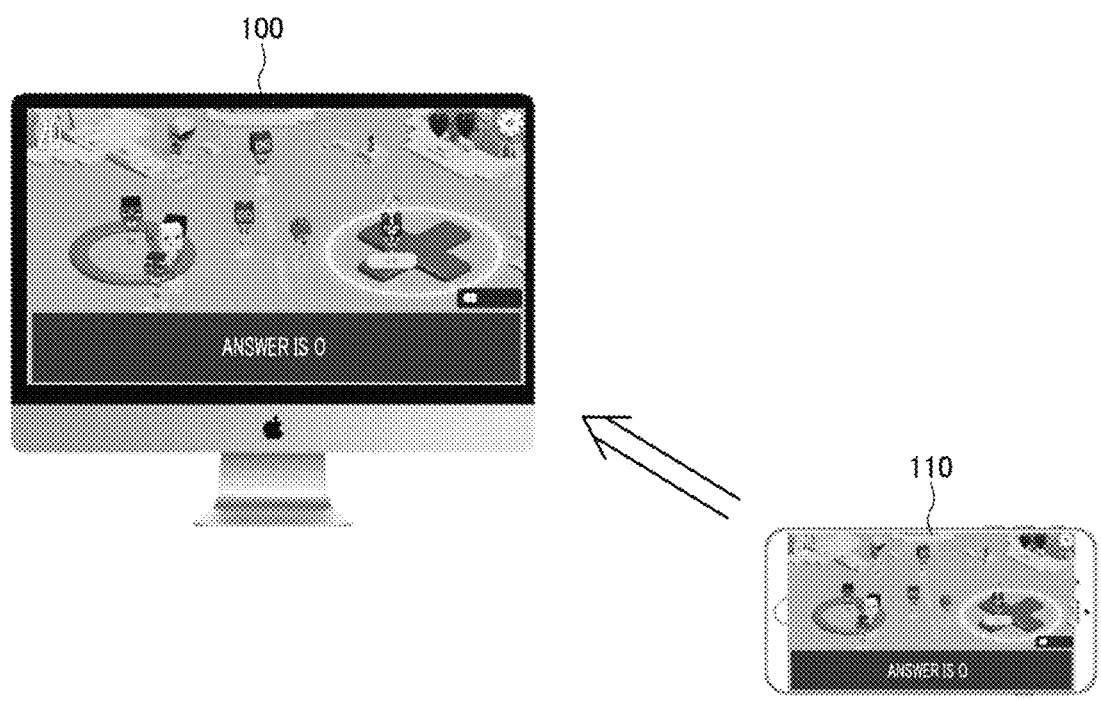
FIG. 4A is a diagram provided to explain a method for setting location information of the first device in accordance with various embodiments described herein.

Referring to FIG. 4A, if the first device 100 is a device which is not frequently changed in location, the location information receiving unit 220 may receive location information of the second device 110 from the second device 110 connected with the first device 100 once or irregularly and store the received location information of the second device 110 in a memory of the first device 100.

Then, the location information linking unit 230 may set the location information of the second device 110 received from the second device 110 as absolute location information of the first device 100. Herein, the location information of the first device 100 set using the location information of the second device 110 can be steadily used without a change until updated by a user of the first device 100. If a location of the first device 100 is changed from a first location to a second location, the connection unit 200 may perform reconnection between the first device 100 and the second device 110 and the location information receiving unit 220 may make a request for location information of the second device 110 to the second device 110 and receive the location information of the second device 110 from the second device 110. The location information linking unit 230 may update the location information of the first device 100 with the re-received location information of the second device 110.

If the first device 100 is a device which is not frequently changed in location, even when communication with the second device 110 is impossible, the first device 100 can continuously use the location information of the second device 110 since the location information of the second device 110 is stored in the memory of the first device 100.

Figure 4B:
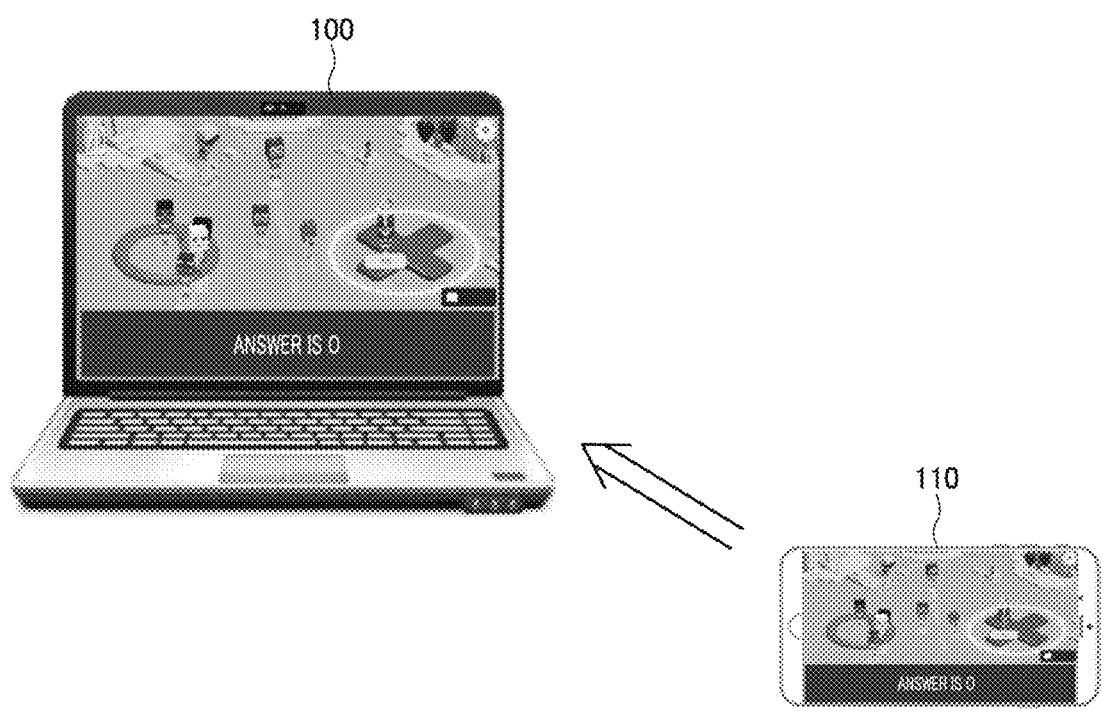
FIG. 4B is a diagram provided to explain a method for setting location information of the first device in accordance with various embodiments described herein.

Referring to FIG. 4B, if the first device 100 is a device which is movable or frequently changed in location, the location information receiving unit 220 may receive location information of the second device 110 from the second device 110 connected with the first device 100 in real time or regularly. Herein, whenever a location of the second device 110 is changed, the location information receiving unit 220 may receive information about the changed location of the second device 110 from the second device 110.

Whenever location information of the second device 110 is changed, the location information linking unit 230 may update the location information of the first device 100 with the location information of the second device 110 in real time or regularly.

Referring to FIG. 2 again, the location information transmission unit 240 may transmit the location information of the first device 100 to the game server 120. For example, as illustrated in FIG. 4A, if the first device 100 is a device which is not frequently changed in location, the location information transmission unit 240 may transmit the location information of the first device 100 set using the location information of the second device 110 to the game server 120 once or irregularly until a location of the first device 100 is changed. If a location of the first device 100 which is not frequently changed in location is changed, the location information transmission unit 240 may transmit location information of the first device 100 set based on location information of the second device 110 received again from the second device 110 to the game server 120 again.

For another example, as illustrated in FIG. 4B, if the first device 100 is a device which is frequently changed in location, the location information transmission unit 240 may receive location information of the second device 110 in real time or regularly and transmit the received location information to the game server 120 in real time or regularly.

The identification information transmission unit 250 may transmit identification information of the first device 100 to the game server 120. Herein, the identification information of the first device 100 may include at least one of, for example, a UUID (Universal Unique Identifier), a GUID (Global Unique Identifier), and a Mac Address.

The game running unit 260 may receive a location-based game based on the location information of the first device 100 from the game server 120 and then run the game.

For example, the game running unit 260 may receive a first game environment allocated by the game server 120 to each location from the game server 120.

The first game environment is, for example, one of game providing environments provided differently depending on a location. For example, a game zone corresponding to a first location (real-world location) may be set as a game zone where a specific item can be obtained and a game zone corresponding to a second location (real-world location) may be set as a game zone where a specific item (e.g., game money, character weapon, etc.) can be obtained when a monster is eliminated or a predetermined mission/quest is completed.

The game running unit 260 may receive a second game environment corresponding to the identification information of the first device 100 from the game server 120. Therefore, the other devices at the location (real-world location) of the first device 100 may be provided with the second game environment from the game server 120.

For example, a game zone corresponding to a location (real-world location) of the first device 100 may be set as a game zone where a specific monster appears or a game zone where a specific mission or quest can be carried out. For another example, the game zone corresponding to the location (real-world location) of the first device 100 may be set as a game competition zone where a character can improve his/her experience level (e.g., attack, defense, etc.) by competing with a specific monster.

Hereinafter, location-based game play method in accordance with an embodiment of the present disclosure will be described briefly with reference to FIG. 5A to FIG. 5D.

Figure 5A:
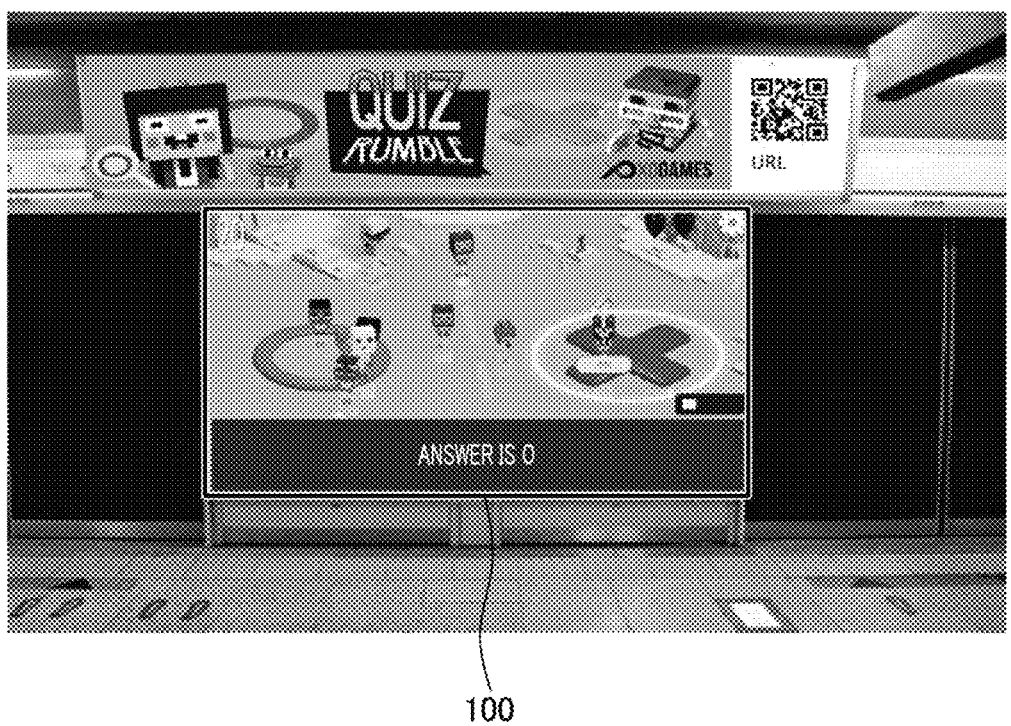
FIG. 5A is a diagram provided to explain a location-based game play method in accordance with various embodiments described herein.

Referring to FIG. 5A, an advertising display device (e.g., the first device 100) for subway train or bus stop is installed at a fixed location, and, thus, a great number of users around the first device 100 can play a game through the first device 100 while waiting for a subway train or a bus. In this case, location information of the second devices 110 (devices of the users around the first device 100) is set as location information of the first device 100, and, thus, the second device 110 is provided with a game service according to the location information of the first device 100 from the game server 120.

The game server 120 can provide different game environments to the first devices 100 installed at subway platforms or bus stops, respectively. Accordingly, the users can be provided with various user experiences in different subway platforms or bus stops. Further, even people who do not play a game can have fun watching the game, which can lead to the promotion of the game.

Figure 5B:
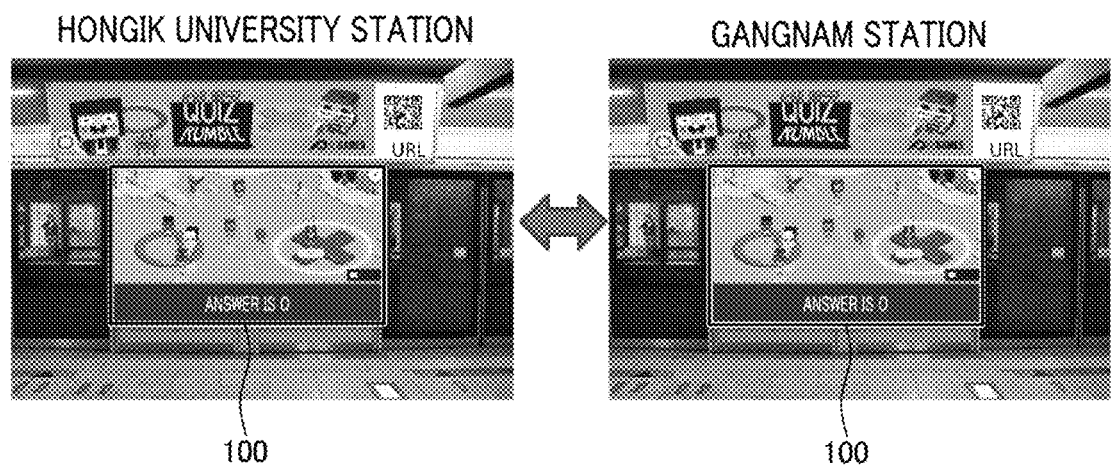
FIG. 5B is a diagram provided to explain a location-based game play method in accordance with various embodiments described herein.

Referring to FIG. 5B, first devices installed at respective fixed locations in specific areas (e.g., a first device in Hongik University station and a first device in Gangnam station) can make a one-to-one pairing for game competition, or multiple first devices can link to one another and play a game by Round Robin method. For example, multiple first devices installed at respective fixed locations in an area or a school may link to one another and play a game competition, and if people from various areas access first devices installed in the respective areas without separate authentication for subscription, they can play a guild game or a team game as members of the first devices with people from other areas through the first devices. Further, a game link between first devices installed in respective areas (or schools, companies, etc.) can contribute to forming a community between the areas.

Figure 5C:
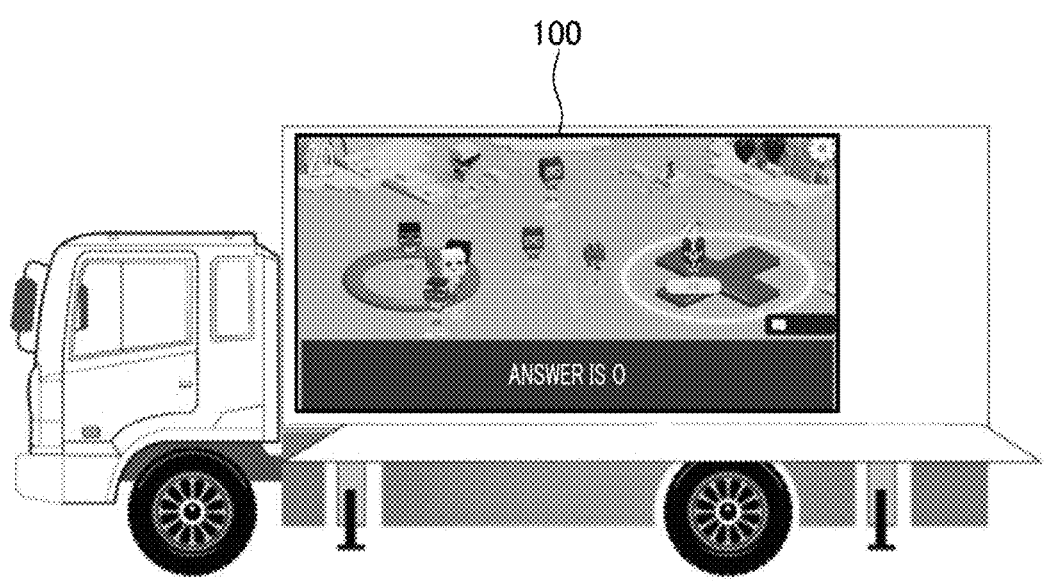
FIG. 5C is a diagram provided to explain a location-based game play method in accordance with various embodiments described herein.

Referring to FIG. 5C, a public screen (the first device 100) without a GPS function may be installed in a moving vehicle (a taxi, a bus, etc.) to provide a location-based game to a user. In this case, the second device 110 may include a device present in the moving vehicle. For example, the second device 110 may be a device of a passenger or driver in the moving vehicle.

As the moving vehicle moves, a location of the second device 110 is changed, and, thus, a location of the screen (the first device 100) is changed.

The game server 120 may set a game environment in order for a specific game character to appear or for a specific item to be obtained in a game zone corresponding to a location of the screen (the first device 100).

The moving vehicle is moved to place the screen (the first device 100) in various areas, which enables users from various areas to experience a specific game environment (appearance of a specific game character or acquisition of a specific item).

Figure 5D:
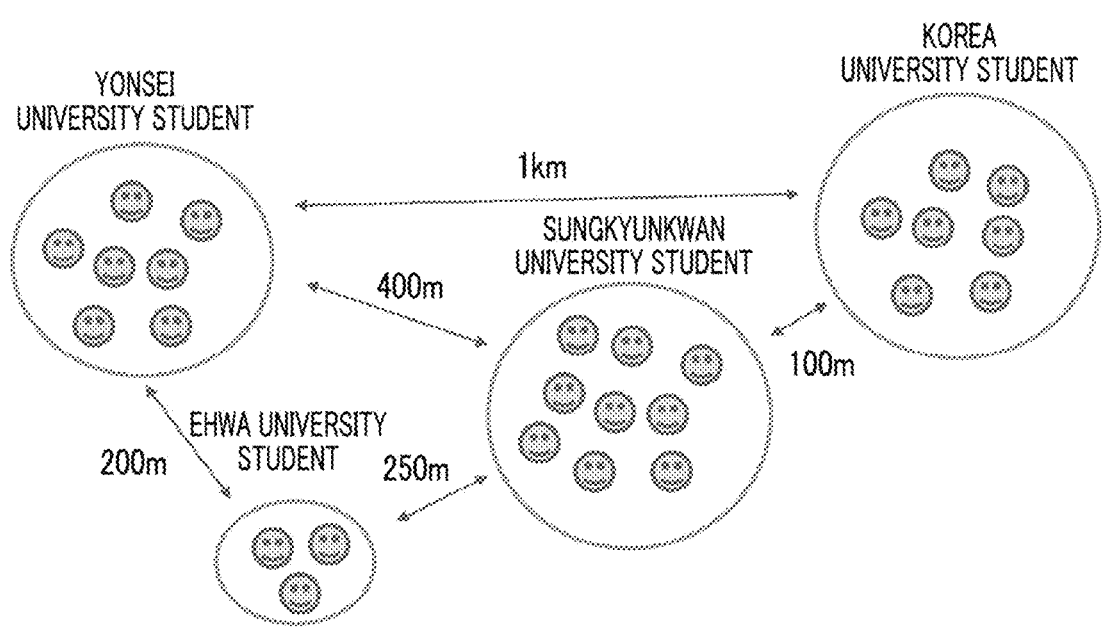
FIG. 5D is a diagram provided to explain a location-based game play method in accordance with various embodiments described herein.

Referring to FIG. 5D, a competitive game or a cooperative game can be played among multiple first devices installed at respective fixed locations in specific areas (or stores).

For example, multiple second devices located within a predetermined distance from a first device installed in a first area can make a first team and multiple second devices located within a predetermined distance from a first device installed in a second area can make a second team.

For example, second devices located within a predetermined distance (e.g., 2 m) from a first device installed in each room of a karaoke bar can be grouped into the same team and teams in the respective rooms can play a competitive game or a cooperative game.

For another example, second devices located within a predetermined range among multiple second devices using a multilateral meeting (date) application can be grouped into a group and a community service can be provided in order for groups to perform interactions such as chatting (video chatting), games, or the like.

For yet another example, second devices belonging to acquaintances set based on a location can be grouped into a group and the location relation between groups can be found based on a distance between the groups (a distance based on a predetermined default location or a corrected mean location of group members: Herein, the corrected mean location is used to handle an error in case of being out of a predetermined range from the default location (e.g., in case of deviating from the default location due to travel or the like)).

Meanwhile, even if a group is not made based on a location, a weight can be given based on a location to recommend or select a second device for game competition. For example, when game members are selected for game competition through a first device at a fixed location, a first weight may be given to a second device located close to the first device and a second weight which is lower than the first weight may be given to a second device located far from the first device.

For still another example, second devices located close to the first device in the various examples described above may exchange first data (large amount of data) and second devices located relatively far from the first device may exchange second data (small amount of data).

Herein, the first data and the second data to be exchanged include, for example, photo and personal information (e.g., phone number, name, age, gender, address, occupation, etc.), and may include various information such as game data, score, acquaintances list, list of people who recently interacted, memo, and the like. Otherwise, the probability (or degree, amount, and constraint) of data exchange between second devices can be set differently based on a distance between the second devices.

Meanwhile, it would be understood by those skilled in the art that each of the connection unit 200, the authentication information output unit 210, the location information receiving unit 220, the location information linking unit 230, the location information transmission unit 240, the identification information transmission unit 250, and the game running unit 260 can be implemented separately or in combination with one another.

Figure 3:
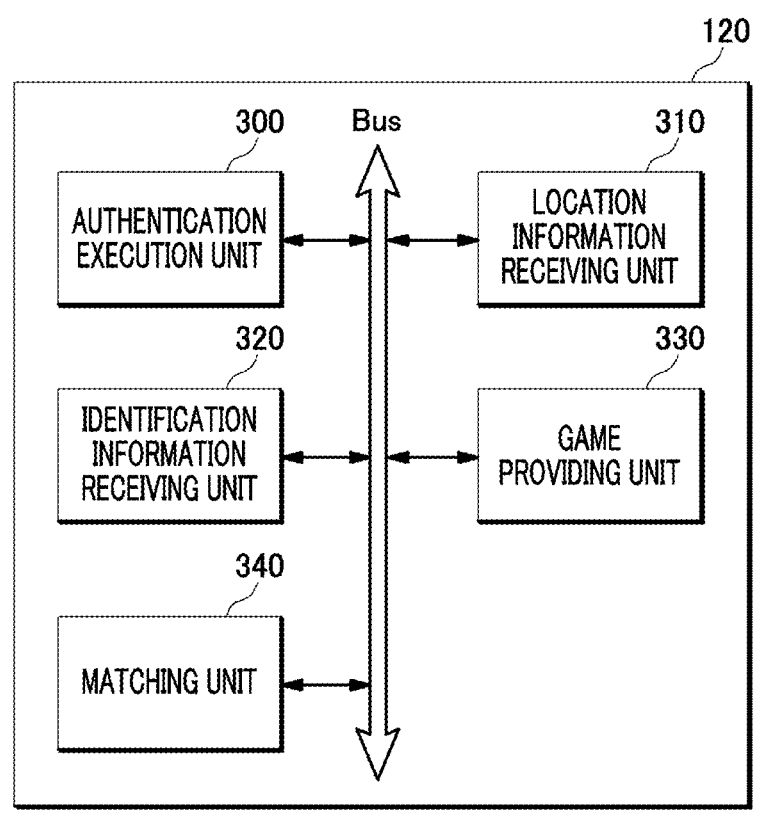
FIG. 3 is a block diagram of a game server illustrated in FIG. 1 in accordance with various embodiments described herein.

FIG. 3 is a block diagram of the game server 120 illustrated in FIG. 1 in accordance with an embodiment of the present disclosure. Referring to FIG. 3, the game server 120 may include an authentication execution unit 300, a location information receiving unit 310, an identification information receiving unit 320, a game providing unit 330, and a matching unit 340. However, the game server 120 illustrated in FIG. 3 is just an embodiment of the present disclosure and can be modified in various ways based on its components illustrated in FIG. 3.

The authentication execution unit 300 may receive one of a QR code, an authentication number, and a URL link from the second device 110 and perform authentication for the second device 110 for connection with the first device 100. Herein, the QR code, the authentication number, and the URL link are authentication information output on the first device 100 to perform authentication for connection between the first device 100 and the second device 110.

The location information receiving unit 310 may receive location information of the first device 100 from the first device 100 connected with the second device 110. Herein, the location information of the first device 100 may be set corresponding to location information of the second device 110 received from the second device 110 connected with the first device 100. The location information of the first device 100 may include, for example, GPS coordinate values corresponding to a location of the second device 110.

If the first device 100 is a device which is at a fixed location or not frequently changed in location, the location information receiving unit 310 may receive location information of the first device 100 from the first device 100 as absolute location information. Herein, the location information of the first device 100 is not changed as long as a location of the first device 100 is changed by a user of the first device 100 or the location information of the first device 100 is updated regularly or as necessary by the user.

If the first device 100 is a device which is frequently changed in location, the location information receiving unit 310 may receive location information of the first device 100 from the first device 100 in real time or regularly as relative location information. Herein, the location information of the first device 100 can be updated in real time or regularly as a location of the second device 110 is changed.

The identification information receiving unit 320 may receive identification information of the first device 100 from the first device 100. Herein, the identification information of the first device 100 may include at least one of a UUID (Universal Unique Identifier), a GUID (Global Unique Identifier), and a Mac Address.

The game providing unit 330 may provide the first device 100 with a game based on the location information of the first device 100. Hereinafter, a method for providing a game will be described briefly with reference to FIG. 6.

Figure 6:
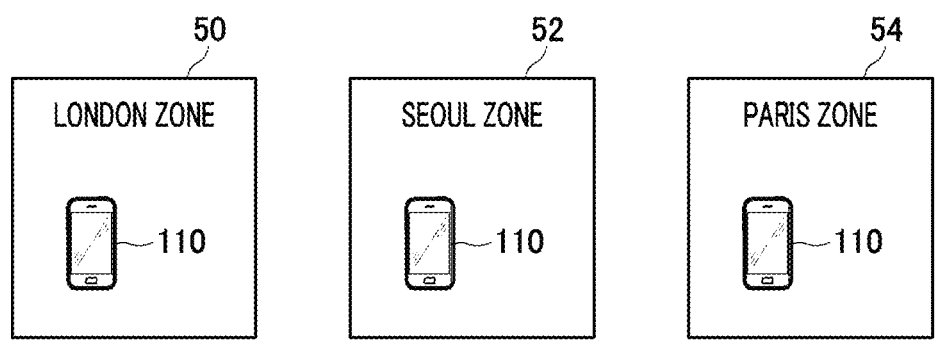
FIG. 6 is a diagram provided to explain a method for providing a game in accordance with various embodiments described herein.

Referring to FIG. 6, the game providing unit 330 may allocate a first game environment to each location (real-world location). Herein, the first game environment may be a game zone where a specific item can be obtained. For example, the first game environment may be set as a game zone where an item (e.g., game money, character weapon, etc.) can be obtained when a monster is eliminated or a predetermined mission/quest is completed.

For example, the second device 110 located in a London zone 50 may be provided with a first game environment allocated to the London zone 50, the second device 110 located in a Seoul zone 52 may be provided with a first game environment allocated to the Seoul zone 52, and the second device 110 located in a Paris zone 54 may be provided with a first game environment allocated to the Paris zone 54.

Otherwise, as described above, the game providing unit 330 may allocate a second game environment to the identification information of the first device 100. The game providing unit 330 may provide different second game environments depending on identification information of a device. Accordingly, the other devices at the location (real-world location) of the first device 100 may be provided with the second game environment from the game server 120.

The matching unit 340 may match the user of the first device 100 with at least one user based on the location information of the first device 100.

The matching unit 340 may match the user of the first device 100 with at least one user based on occupation information or social network information. For example, the matching unit 340 may make classify users with similar characteristics or similar interests in a public area (e.g., a concert hall, a theater, etc.) and match the user of the first device 100 with at least one user with similar characteristics or similar interests to the user of the first device 100. The matching unit 340 may classify a user located within a predetermined distance from the user of the first device 100 based on personal connection information of the first device 100 generated according to social network information from social platforms (e.g., KaKaoTalk, Line, Facebook, etc.) together with the user of the first device 100 and invite the user to a game of the first device 100, and may also invite a user who is not located within a predetermined range from the user of the first device 100 to the game of the first device 100.

For example, the first device 100 can be matched with at least one user with similar information to the user of the first device 100 by using information such as game proficiency, gender, nationality, age, occupation, company, etc. included in the personal connection information of the first device 100 generated according to the social network information.

Meanwhile, it would be understood by those skilled in the art that each of the authentication execution unit 300, the location information receiving unit 310, the identification information receiving unit 320, the game providing unit 330, and the matching unit 340 can be implemented separately or in combination with one another.

Figure 7:
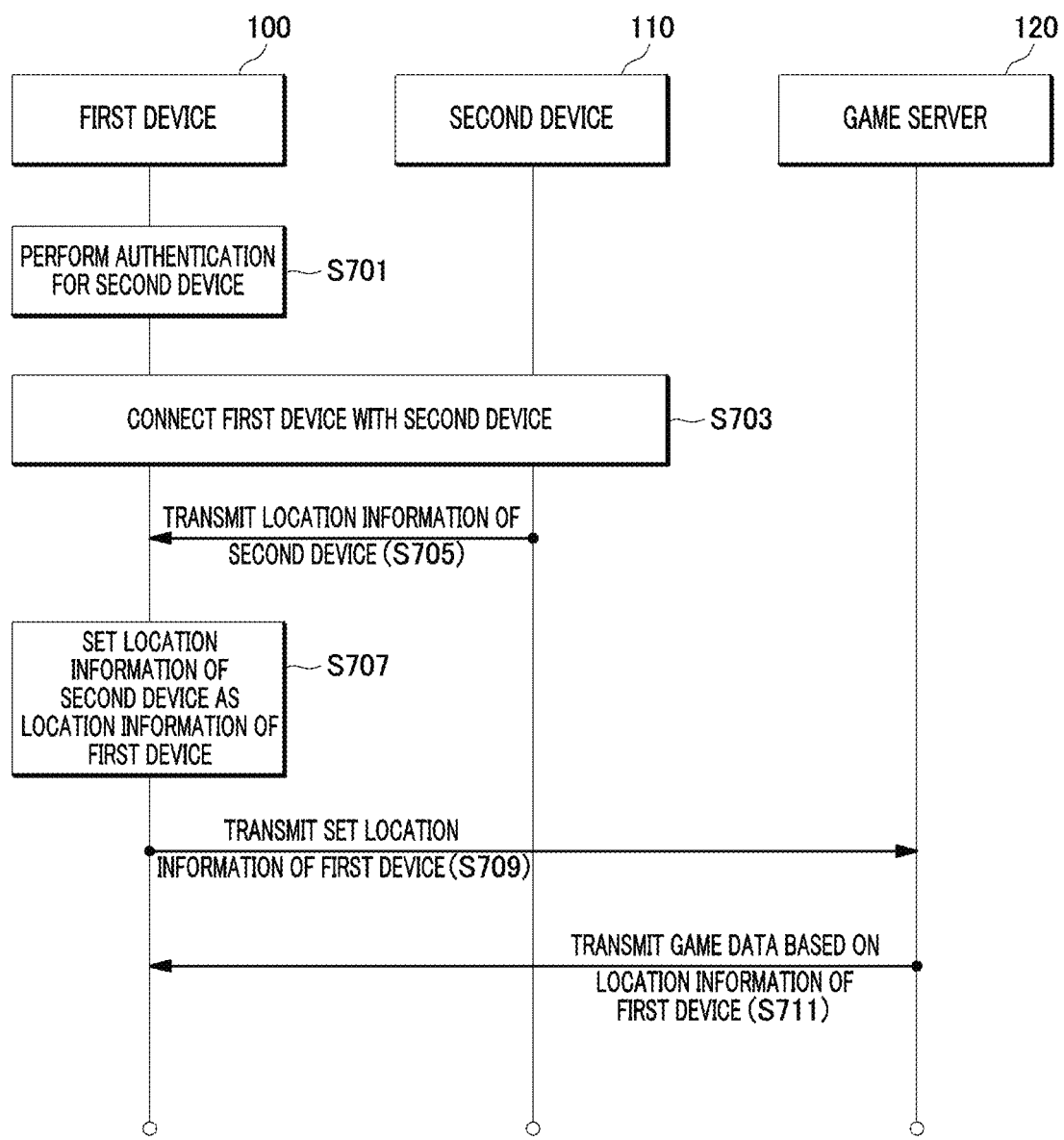
FIG. 7 is an operation flowchart showing a process of providing a location-based game in accordance with various embodiments described herein.

FIG. 7 is an operation flowchart showing a process of providing a location-based game in accordance with an embodiment of the present disclosure.

A method for providing a location-based game according to the embodiment illustrated in FIG. 7 includes the processes time-sequentially performed by the first device 100, the second device 110, and the game server 120 according to the embodiment illustrated in FIG. 1 to FIG. 6. Therefore, descriptions of the processes performed by the first device 100, the second device 110, and the game server 120 illustrated in FIG. 1 to FIG. 6 may be applied to the method for providing a location-based game according to the embodiment illustrated in FIG. 7, even though they are omitted hereinafter.

Referring to FIG. 7, in S701, the first device 100 may perform authentication for the second device 110.

In S703, the first device 100 may be connected with the second device 110.

In S705, the first device 100 may receive location information of the second device 110 from the connected second device 110.

In S707, the first device 100 may set the location information of the second device 110 received in S705 as location information of the first device 100.

In S709, the first device 100 may transmit the location information of the first device 100 set in S707 to the game server 120.

In S711, the game server 120 may transmit game data based on the location information of the first device 100 to the first device 100.

Although not illustrated in FIG. 7, the first device 100 may be connected with the second device 110 using one of Bluetooth, WiFi Direct, and Internet network subnet information to perform authentication between the first device 100 and the second device 110 in S701.

Although not illustrated in FIG. 7, the first device 100 may output one of a QR code, an authentication number, and a URL link in S701.

Although not illustrated in FIG. 7, the game server 120 may receive one of the QR code, the authentication number, and the URL link output on the first device 100 from the second device 110 after S701.

Although not illustrated in FIG. 7, the first device 100 may be connected with the second device 110 using at least one of Bluetooth, WiFi Direct, infrared communication, and cellular communication in S703.

In the descriptions above, the processes S701 to S711 may be divided into additional processes or combined into fewer processes depending on an embodiment. In addition, some of the processes may be omitted and the sequence of the processes may be changed if necessary.

Figure 8:
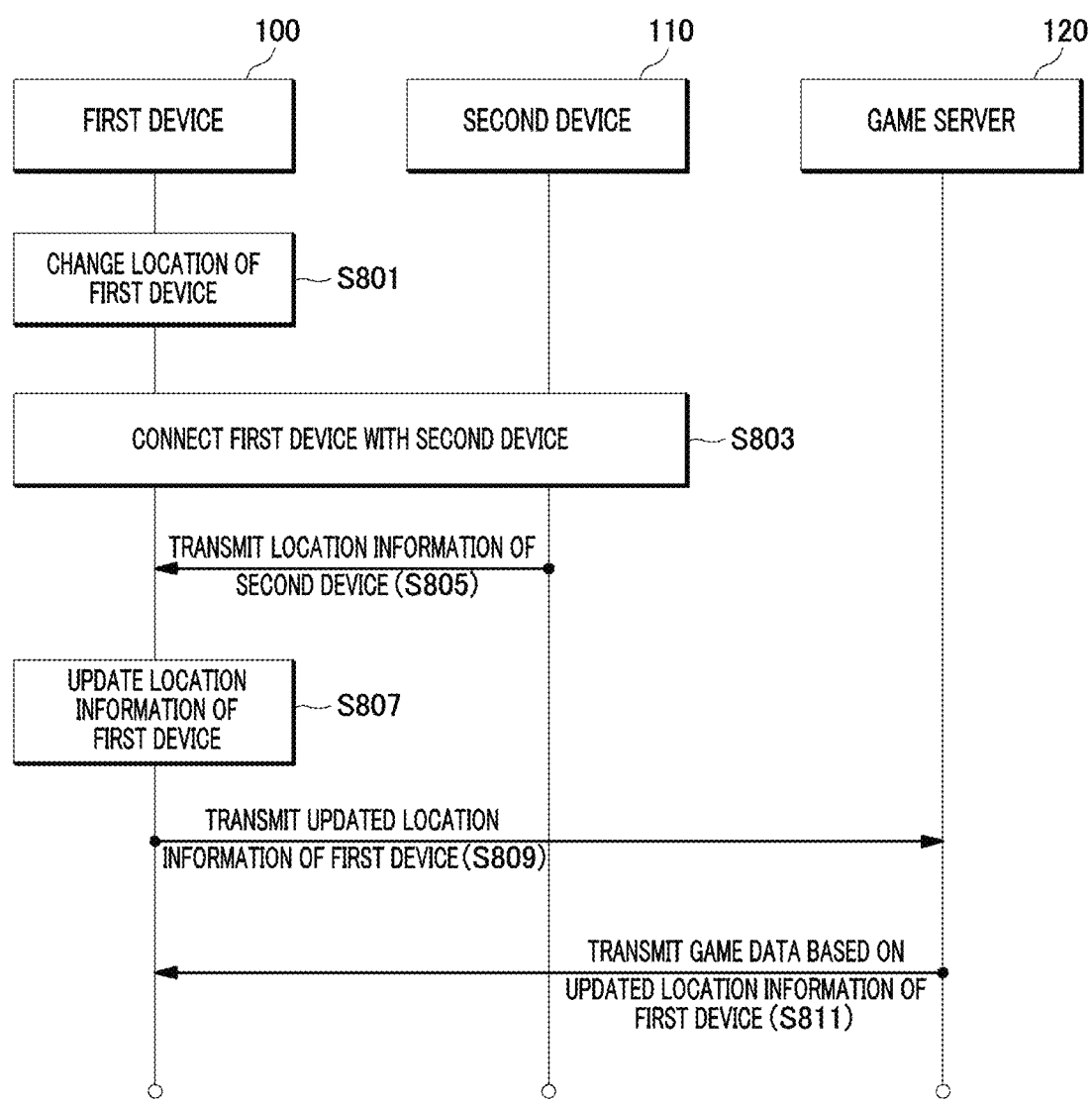
FIG. 8 is an operation flowchart showing a process of providing a location-based game in accordance with various embodiments described herein.

FIG. 8 is an operation flowchart showing a process of providing a location-based game in accordance with another embodiment of the present disclosure.

A method for providing a location-based game according to the embodiment illustrated in FIG. 8 includes the processes time-sequentially performed by the first device 100, the second device 110, and the game server 120 according to the embodiment illustrated in FIG. 1 to FIG. 7. Therefore, descriptions of the processes performed by the first device 100, the second device 110, and the game server 120 illustrated in FIG. 1 to FIG. 7 may be applied to the method for providing a location-based game according to the embodiment illustrated in FIG. 8, even though they are omitted hereinafter.

Referring to FIG. 8, if a location of the first device 100 is changed in S801, the first device 100 may be reconnected with the second device 110 in S803. Herein, the first device 100 may be a device which is not frequently changed in location.

In S805, the first device 100 may receive location information of the second device 110 from the connected second device 110.

In S807, the first device 100 may update location information of the first device 100 based on the location information of the second device 110 received in S805.

In S809, the first device 100 may transmit the location information of the first device 100 updated in S807 to the game server 120.

In S811, the first device 100 may be provided with a game based on the location information of the first device 100 from the game server 120.

In the descriptions above, the processes S801 to S811 may be divided into additional processes or combined into fewer processes depending on an embodiment. In addition, some of the processes may be omitted and the sequence of the processes may be changed if necessary.

Figure 9:
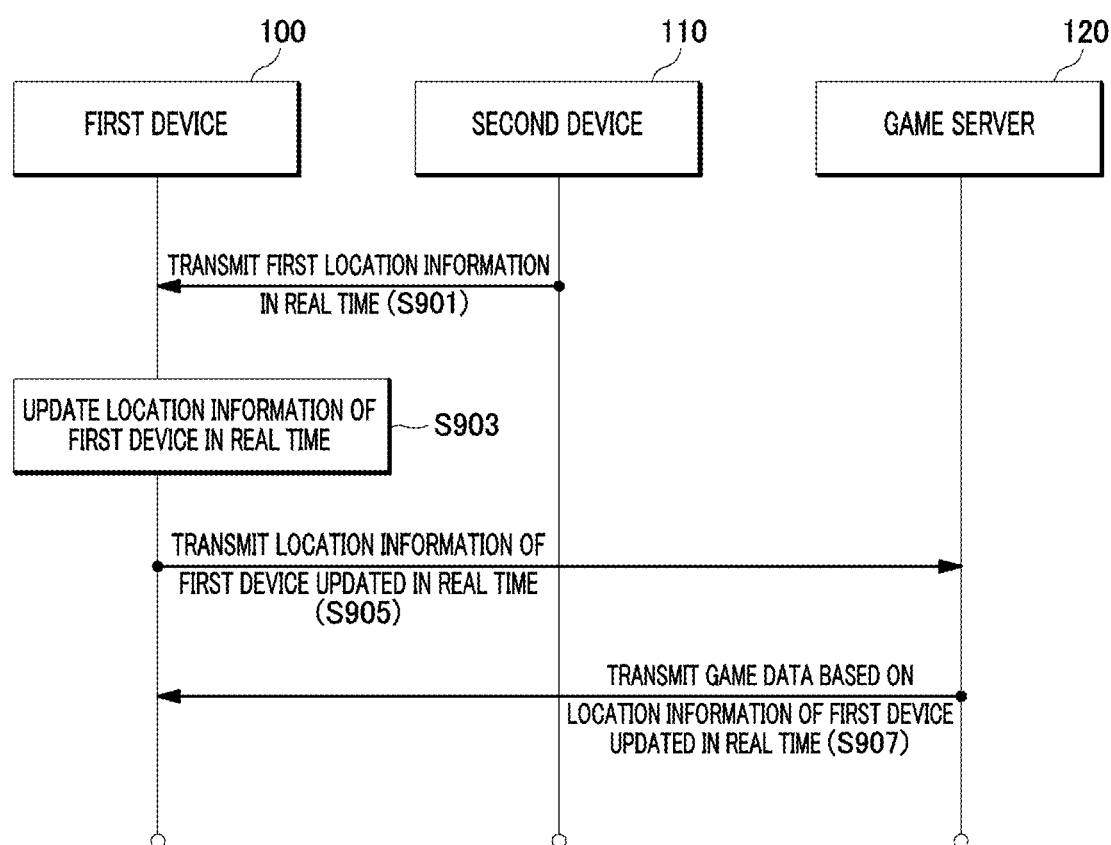
FIG. 9 is an operation flowchart showing a process of providing a location-based game in accordance with various embodiments described herein.

FIG. 9 is an operation flowchart showing a process of providing a location-based game in accordance with another embodiment of the present disclosure.

A method for providing a location-based game according to the embodiment illustrated in FIG. 9 includes the processes time-sequentially performed by the first device 100, the second device 110, and the game server 120 according to the embodiment illustrated in FIG. 1 to FIG. 8. Therefore, descriptions of the processes performed by the first device 100, the second device 110, and the game server 120 illustrated in FIG. 1 to FIG. 8 may be applied to the method for providing a location-based game according to the embodiment illustrated in FIG. 9, even though they are omitted hereinafter.

Referring to FIG. 9, in S901, the first device 100 may receive location information of the second device 110 from the second device 110 in real time or regularly after being connected with the second device 110. Herein, the first device 100 may be a device which is frequently changed in location.

In S903, the first device 100 may update location information of the first device 100 in real time or regularly based on the location information of the second device 110 received in S901.

In S903, the first device 100 may transmit the location information of the first device 100 updated in real time or regularly to the game server 120.

In S907, the first device 100 may be provided with a game based on the location information of the first device 100 updated in real time or regularly from the game server 120.

In the descriptions above, the processes S901 to S907 may be divided into additional processes or combined into fewer processes depending on an embodiment. In addition, some of the processes may be omitted and the sequence of the processes may be changed if necessary.

The embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage medium includes all volatile/non-volatile and removable/non-removable media embodied by a certain method or technology for storing information such as computer-readable instruction code, a data structure, a program module or other data.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

I claim:

1. A game server for providing a location-based game, comprising:
   a location information receiving unit configured to receive location information of a first device from the first device;
   a game providing unit configured to provide a game based on the location information of the first device to the first device; and
   an identification information receiving unit configured to receive identification information of the first device from the first device,
   wherein the first device is connected with a second device,
   the location information of the first device is set based on location information of the connected second device,
   the first device is a device without a GPS (Global Positioning System) function and the second device is a device with the GPS function,
   the game providing unit allocates a first game environment to the identification information of the first device, and
   the identification information of the first device includes at least one of a UUID (Universal Unique Identifier), a GUID (Global Unique Identifier), and a Mac Address.

2. The game server of claim 1,
wherein the game providing unit allocates a second game environment to a game zone corresponding to a predetermined location.

3. The game server of claim 2,
wherein the second game environment is set in order for a specific item to be obtained in the game zone corresponding to the predetermined location.

4. The game server of claim 1,
wherein the first game environment is set in order for a specific game character to appear in a game zone corresponding to a location of the first device.

5. The game server of claim 1, further comprising:
a matching unit configured to match a user of the first device with another user based on the location information of the first device.

6. The game server of claim 5,
wherein the matching unit matches the user of the first device with the other user based on job information or social network information.

7. A method for providing a location-based game performed by a game server, comprising:
   receiving location information of a first device from the first device;
   providing a game based on the location information of the first device to the first device; and
   receiving identification information of the first device from the first device,
   wherein the first device is connected with a second device,
   the location information of the first device is set based on location information of the connected second device,
   the first device is a device without a GPS (Global Positioning System) function and the second device is a device with the GPS function,
   the providing the game based on the location information of the first device to the first device includes allocating a first game environment to the identification information of the first device, and
   the identification information of the first device includes at least one of a UUID (Universal Unique Identifier), a GUID (Global Unique Identifier), and a Mac Address.

8. The method of claim 7,
the providing of the game based on the location information of the first device to the first device includes allocating a second game environment to a game zone corresponding to a predetermined location.

9. The method of claim 8,
wherein the second game environment is set in order for a specific item to be obtained in the game zone corresponding to the predetermined location.

10. The method of claim 7,
wherein the first game environment is set in order for a specific game character to appear in a game zone corresponding to a location of the first device.

11. The method of claim 7, further comprising:
matching a user of the first device with another user based on the location information of the first device.

12. The method of claim 11,
wherein the matching of the user of the first device with another user based on the location information of the first device includes matching the user of the first device with the other user based on job information or social network information.

* * * * *